Dec. 4, 1962  B. W. KING  3,066,531
INSTRUMENT FOR DETERMINING THE ELEVATION ABOVE WATER LEVEL
Filed Nov. 12, 1957  4 Sheets-Sheet 1
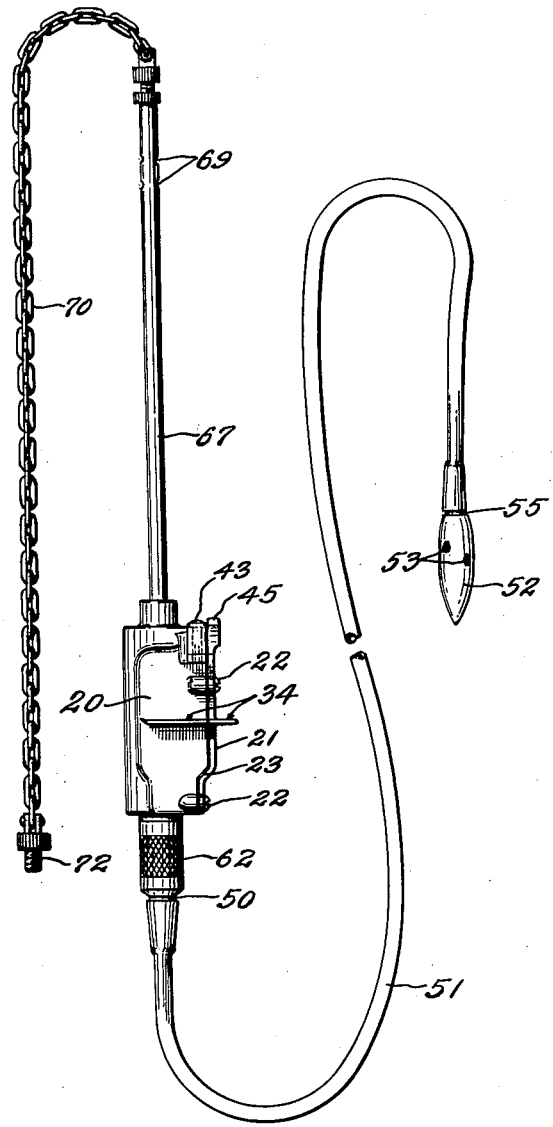
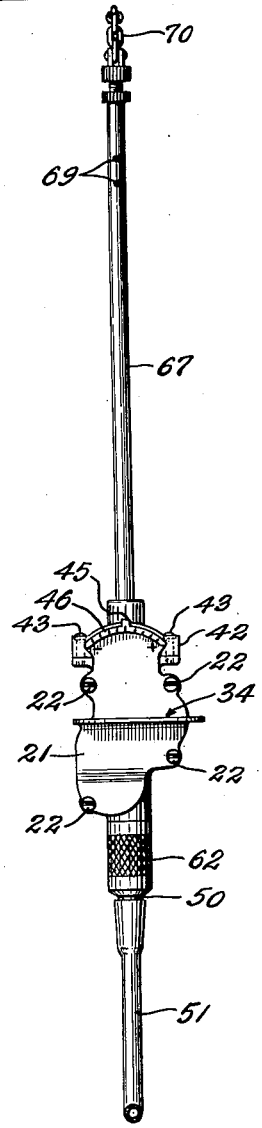
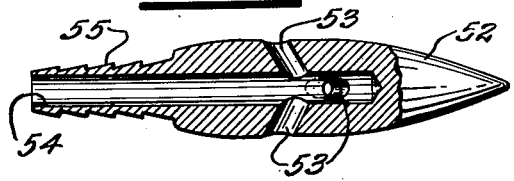
INVENTOR.
BERTELL W. KING
BY
Bohleber, Fassett & Montstream
ATTORNEYS

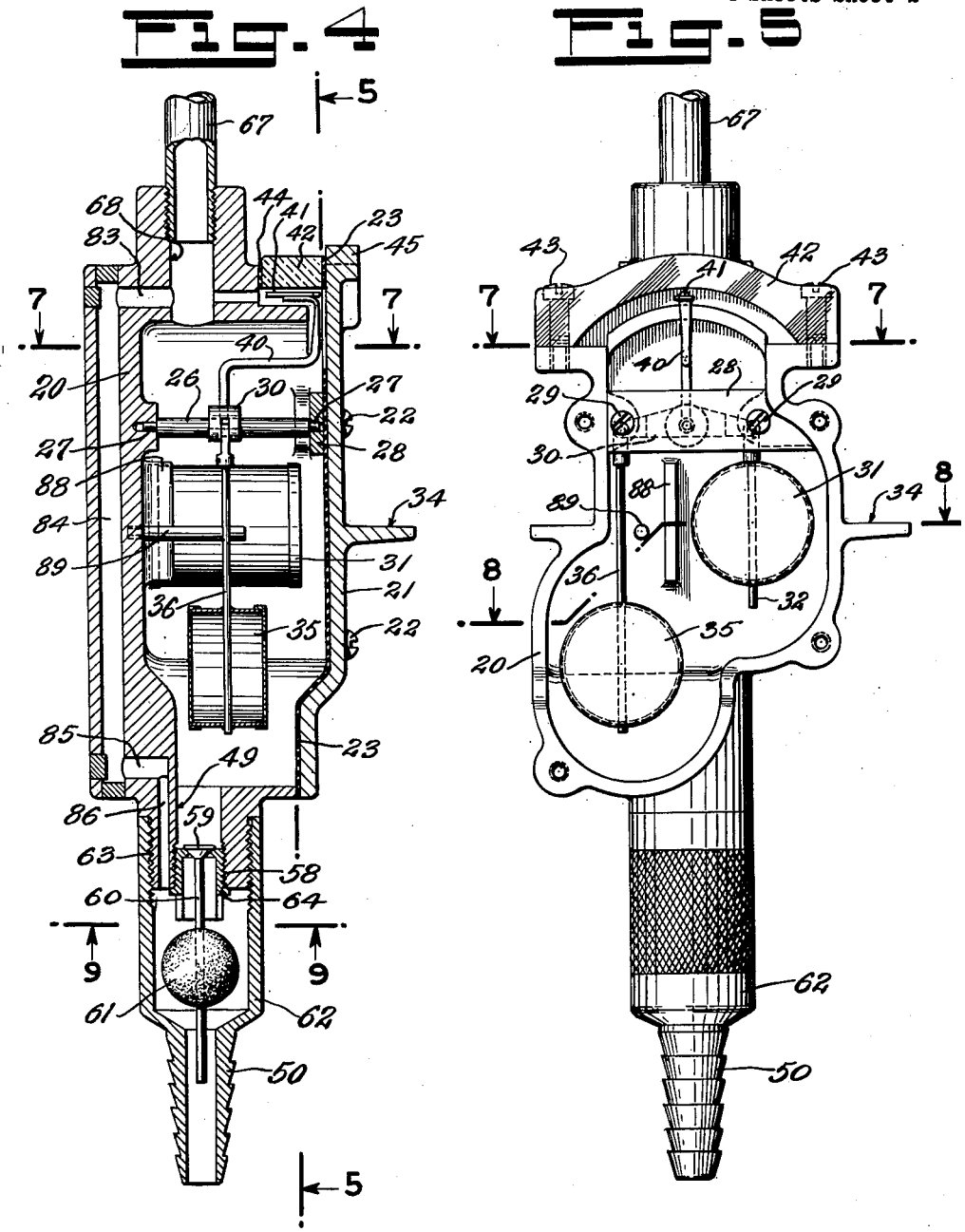

Dec. 4, 1962  B. W. KING  3,066,531
INSTRUMENT FOR DETERMINING THE ELEVATION ABOVE WATER LEVEL
Filed Nov. 12, 1957  4 Sheets-Sheet 3
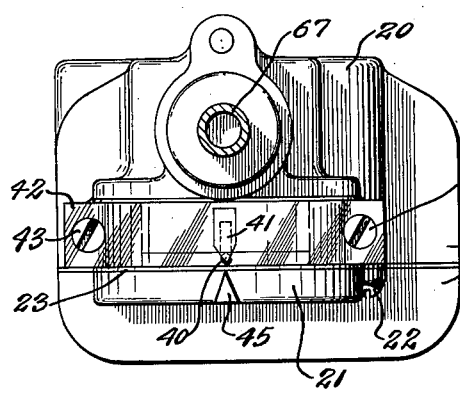
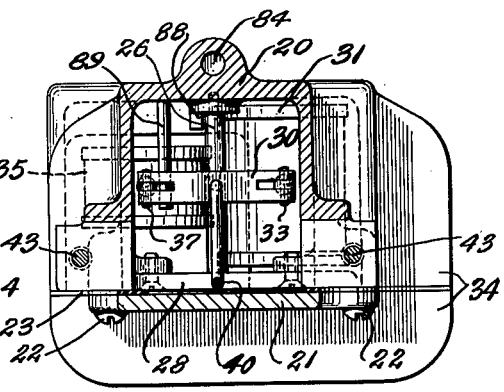
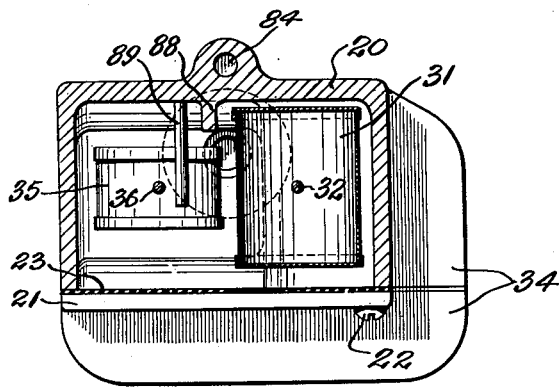
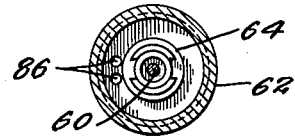
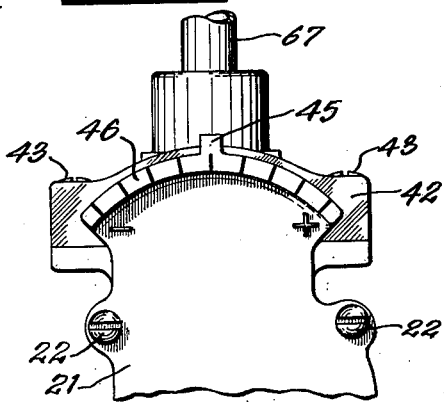
INVENTOR.
BERTELL W. KING
BY
ATTORNEYS Dec. 4, 1962     B. W. KING     3,066,531
INSTRUMENT FOR DETERMINING THE ELEVATION ABOVE WATER LEVEL
Filed Nov. 12, 1957     4 Sheets-Sheet 4
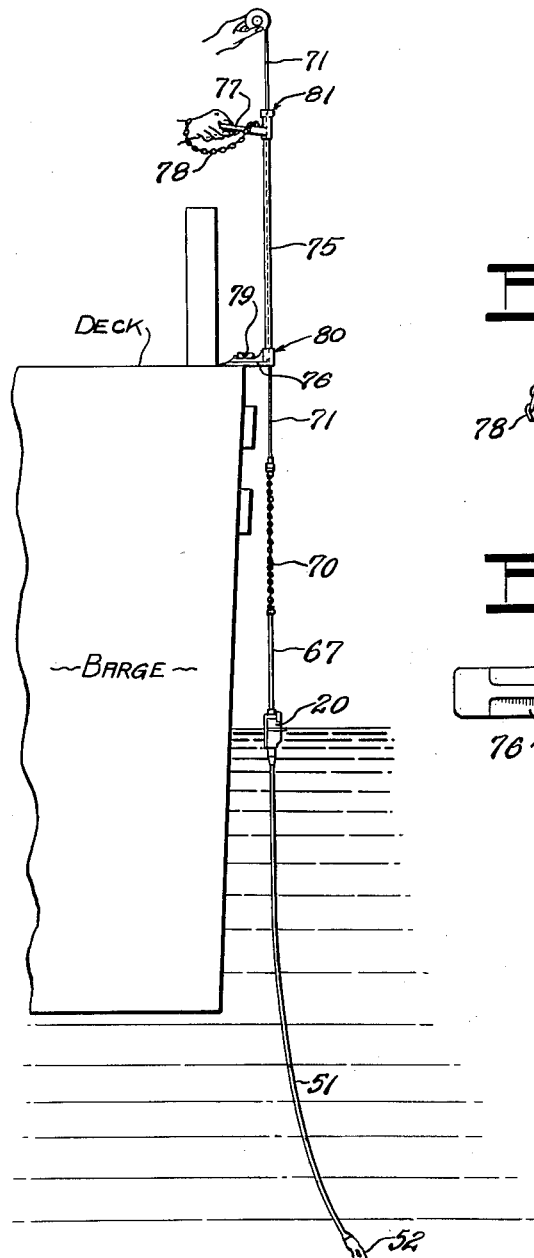
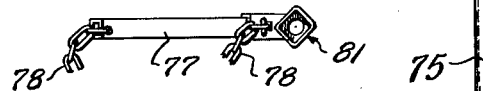
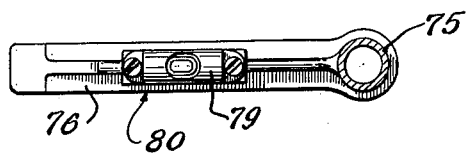
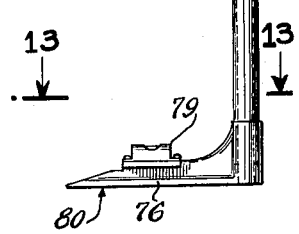
INVENTOR.
BERTELL W. KING
BY
ATTORNEYS

3,066,531
INSTRUMENT FOR DETERMINING THE ELEVATION ABOVE WATER LEVEL
Bertell W. King, 17 Battery Place, Brooklyn, N.Y.
Filed Nov. 12, 1957, Ser. No. 695,872
1 Claim. (Cl. 73—290)

The invention relates to an instrument or device for accurately determining the elevation of a position such as the deck of a barge with respect to the true surface of the water. By taking a series of such measurements around a barge, when the barge is unloaded and when the barge is loaded the difference can be used in the calculation to determine the weight of the load. If the surface of the water is rough, as it is in most cases, it becomes difficult to determine the surface level of the water which must be determined or established in order to measure the elevation of the deck above the water line. Patent 2,265,647 describes an instrument for determining this elevation or height. The invention herein is an improvement on the construction of this earlier patent. The earlier device required an adjustment to be manually inserted into the device, in the event that the barge changed from salt water, brackish water or fresh water, because the specific gravity of the water was different and this affected the position of the float used in the device and hence required manual setting of the instrument for the specific gravity of the water.

The device of this invention automatically adjusts itself for the specific gravity of the water and no determination of the specific gravity need be made and no manual adjustment of the device need be made. This avoids the possibility that the operator may intentionally or unintentionally fail to make a reading of a hydrometer for determination of the specific gravity or may make an improper reading or may forget to make the adjustment on the device. Such errors will not occur with the device to be described herein. The device also enables an adjustment of the reading to be made as to water level in the event that it is impossible to set the instrument precisely at water level.

It is the principal object of the invention to construct a device for measuring an elevation above true water level, such as from the deck of a barge, in which the device automatically compensates for the specific gravity of the water in which the barge is floating.

Another object is to construct a device for measuring an elevation above the water level and providing an indication of any error which may result from an inability to accurately sight the position of or locate the casing at water level.

Another object is to provide an improved inlet nozzle.

Other objects of the invention will be more apparent from the following description when taken in connection with the accompanying drawings in which:

FIG. 1 is a side elevation of the device in reduced size;

FIG. 2 is a front elevation of the device;

FIG. 3 is a section through the inlet nozzle;

FIG. 4 is a generally vertical section through the float chamber;

FIG. 5 is a view into the float chamber with the cover removed taken on line 5—5 of FIG. 4;

FIG. 6 is a top view of the float chamber;

FIG. 7 is a cross section through the float chamber taken on line 7—7 of FIG. 4;

FIG. 8 is a cross section through the float chamber taken on line 8—8 of FIG. 5;

FIG. 9 is a cross section through a check valve portion of the float chamber taken on line 9—9 of FIG. 4;

FIG. 10 is a full-sized view of the indicator scale;

FIG. 11 is a side view of a pedestal or stand;

FIG. 12 is a top view of the pedestal handle taken on line 12—12 of FIG. 11;

FIG. 13 is a top view of the foot of the pedestal taken on line 13—13 of FIG. 11; and FIG. 14 illustrates the manner of using the device in order to determine the elevation of the deck of a barge above the mean water line.

The instrument includes a float casing or housing including a casing member 20 having a cover 21 secured thereto by suitable screws 22 and forming an enclosed chamber for two floats as will appear. A gasket 23 is used between the casing member and cover to seal the chamber. The two floats are connected together in opposition which connecting means includes a horizontal pivot or shaft 26, pivotally mounted in the chamber in a bearing 27 in one wall of the casing and in a bearing 27 carried by a cross brace 28 which is secured to and within the chamber such as by screws 29. The pivot or shaft carries a cross arm or arms 30 extending on opposite sides of the pivot. One end of one cross arm mounts a main or first float 31 carried on a float pin 32 which is mounted or fixed to the end of one cross arm such as by a pivot pin 33 (FIG. 7). The top surface 34 of a flange, forming a part of the casing, corresponds with the zero water level in the chamber, that is the normal level of the water with respect to the float. In the construction shown this level is the center of the float in normal operating or measuring position.

Suspended from the other end of or the other cross arm 30 is a compensating means shown as a second float 35 mounted on a float pin 36 which is fixed to the other end of the cross arm or the end of the other arm such as by a pivot pin 37. The float pins 32 and 36 are desirably connected with its cross arm equidistant from the axis of the pivot 26 and on opposite sides thereof. The floats are therefore connected together in opposition or so that their buoyancies are opposed. In the illustrated construction the float pin 36 is longer than the float pin 32 so that the compensating float is well below the level of the main float 31 for complete immersion in the water in the chamber when in use. The compensating float 35 has a volumetric capacity or displacement which is preferably half that of the main or first float 34. It is shown as of the same diameter but half the length of the main float. This brings the water line on the main float to its mid position. It will be noted therefore that the compensating float may serve two functions namely to locate the water level wherever desired with respect to the main float for a balanced position and to compensate for changes in the specific gravity of the water or fluid. For a cylindrical main float mounted with its axis horizontal, the water line then is at the maximum dimension or cross section of the main float and where volume change is nil. Both floats are sealed against leakage of water into the float. The compensating float is located to be completely immersed when a reading is taken. The weights of the two floats and connections must be the same in order to remove this as a factor. Compensation may be secured with floats of any shape although curved tops should be used to avoid water or air on the top surface which would change the effective weight of a float.

Preferably the main float 31 with its float pin is given a weight such that it normally floats at mid position in fresh water. The compensating float with its float pin is given a weight which is the same as the weight of the fresh water displaced, that is it has neither buoyancy nor weight when submerged in fresh water. Its volume is half that of the main float; that is, equal to the submerged portion. The lever arms are also equal, that is the distance between the pin 37 and the pivot or shaft 26 is the same as the distance between the pin 33 for the main float and the pivot or shaft. So constructed the instrument compensates for variations in specific gravity of the water. It is clear that the two floats may be related to sea water rather than fresh water in which case compensation is achieved as well.

An indicator is connected with the floats to show the position of the floats or the main float. The indicator shown is an upwardly extending pointer arm 40 which is secured to or carried by the pivot or the cross arms and it carries a pointer 41 which is visible through a transparent member 42 of glass, plastic or the like secured to the top of the casing such as by screws 43. Gaskets 44 seal the same against water leakage. A fixed or reference pointer 45 may be carried by any stationary part of the casing, however, it is convenient that it be carried by the upper edge of the cover 21. Because the reference pointer 45 may be fixed, it also may be located centrally with respect to the range of movement of the movable pointer 41. The casing also may carry a graduated scale 46 in a position to be read from the pointer such as the surface of the transparent member. It is deemed desirable, however, not to put graduations on this transparent member and, therefore, the graduated scale 46 is provided on the cover 21 adjacent to the movement of the pointer 41. Since the pointer may be twice as far from the axis of the pivot as the point of attachment of the float, this amplifies the movement of the float and the scale 46 gives a more precise measurement of the water level in the chamber than that provided in the prior device. The purpose of this scale will be described hereinafter.

In order to determine the mean level of the water surface in which the barge is floating, it is necessary that the water level within the casing chamber be free of normal surface agitation or waves. It is for this reason that the casing has a water inlet at the bottom thereof which includes a passage 49 connected with a nipple 50. A flexible tube 51 is attached to the nipple which tube is of sufficient length to carry well below the surface to an area not effected on wave action, that is the lower end is in water which is free of such surface agitation and not affected thereby. A suitable nozzle 52 is carried on the lower end of the tube to give it weight so that the end is carried deep into the water. The nozzle has inlet openings 53 connecting with a central passage 54. A nipple 55 receives the lower end of the flexible tube 51. The openings are in the side of the nozzle at an angle to the central passage 54 so that any pressures created by any current over the nozzle will cancel out and not effect the level of water within the casing.

Preferably a check valve is provided in the water inlet, the purpose of which will be described hereinafter. The check valve is conveniently carried by the casing and comprises a valve seat member 58 secured in the passage 49 which seat is engaged by a valve 59 connected through a stem 60 to a valve float 61. The valve float is conveniently mounted within a valve housing 62 secured to the casing around the passage 49 such as by threads 63. In normal use, the water enters the nozzle and passes through the flexible tube into the casing so that the buoyancy of the valve float 61 opens the check valve 59 and the water enters freely into the casing. The lower end of the valve seat member has slots 64 so that the valve float 61 cannot close off free passage of water upwardly through the valve and passage 49.

A vent is provided into the top or upper portion of the casing and includes a vent tube 67 secured to the casing in any suitable manner and is connected with the chamber or interior of the casing by means of a passage 68 at the top of the casing. This vent tube has a vent hole or holes 69 at the upper end of the tube.

The device is supported or suspended by suitable means, that particularly shown including a chain 70 connected at any suitable point with the casing and a convenient connection is with the upper end of the vent tube. The chain assures that the device hangs vertically. The suspension means also includes a flexible member which preferably is a tape 71 attached to the casing and particularly to the end of the chain by means of a threaded stud 72. It is desirable to measure the elevation relative to the level of the water or reference zero which corresponds with the surface 34. The position of the stud 72 above the surface 34 should be known and it is convenient that it be a whole number.

In order to conveniently handle the device, a stand or pedestal is provided in the form of a hollow tube 75 through which the tape 71 passes. The tube has a foot 76 at the lower end of the tube which is used to contact the deck D of the barge. The pedestal or stand may have a handle 77 at the upper end thereof on which there may be a wrist strap or chain 78 which may be attached to the operator's wrist and thereby avoid danger of dropping the device. It is desirable too, that the stand carry a level 79 at a convenient point which may be the foot 76 on the pedestal. The level enables the operator to check the vertical position of the stand so that an accurate measurement may be secured. It is desirable that the distance from the bottom surface 80 of the foot to the top edge 81 of the pedestal be a known whole number. For example by making this dimension three feet, and with the distance from the surface 34 to the end of the chain being three feet, then the tape or scale reading taken from the surface 81 is the elevation of the deck above the mean water line. A suitable bypass (FIG. 4) is provided in the casing between the passage 68 and the valve float chamber 62 by the passages 83, 84, 85 and 86.

The operation of the device will now be described. In using the instrument, the casing is lowered from the pedestal by the operator by means of the tape 71 who locates the surface 34 at the water level in which the barge is floating. The surface of the water usually is rough or wavy so that it would be mere guesswork to locate the surface at the exact water level without aid from the main float 31. Water below the surface agitation flows through the nozzle 52, the flexible tube 51, past the check valve 59, which is held open by the valve float 61, into the chamber of the casing. The buoyancy of the float 31 will cause it to assume a position corresponding with the level of the water within the chamber. Since the water connection 51, 52 is uninfluenced by surface agitation such agitation will not influence the position of the float system. With the main float 31 normally floating with the water level at its center or mid position, the device is made to locate the surface 34 corresponding with the mid position of the float 31. In this position of the main float, the pointer 41 is located at the reference or reference pointer 45 on the casing. The operator, by raising or lowering the casing varies the water level within the chamber and the position of the main float with respect to the chamber. The pointer 41 so indicates the position of the float that when this pointer is aligned with the fixed reference 45, the operator knows that the water level within the casing is at the same level as the surface 34 and of the true water level of the water in which the vessel is floating. He may take the reading on the tape from the deck at the top surface 81 of the pedestal which gives him the elevation of this point of the deck above mean water or surface level. By taking a number of measurements the mean elevation of the deck may be determined which provides one of the factors from which the displacement of the barge may be calculated to give the load on the barge.

It has been mentioned that in applicant's earlier patent that the specific gravity of the water must be determined by a hydrometer whereupon the position of the pointer is manually adjusted in accordance with this specific gravity. In other words, salt water having greater density or specific gravity than fresh water gives the main float greater buoyancy and it would normally float higher in salt water. This means that when the float pointer is in alignment with the reference 45 the actual mean water level is actually lower than the surface 34. By a like token, if the barge is in fresh water which has a specific gravity less than salt water, the float sinks deeper or is immersed a greater extent in fresh water so that without any adjustment the main float would sink deeper into this water, that is the water level would be higher than indicated by the position of the float and the float pointer. It is for this reason that the earlier device was adjustable for the specific gravity of the water. An operator may forget to adjust the setting in the device or may make a guess at it or just may not care. This could mean a substantial difference in the calculation of the loaded displacement of any barge and particularly of a large vessel.

The compensating or second float 35 is provided so that its buoyancy counteracts the buoyancy of the main float due to differences in the specific gravity of the water. This compensation is secured by the buoyancy of the two floats opposing each other such as by attaching the second float on the opposite side of the pivot 26 or at opposite ends of the cross arm 30. The compensating float is mounted so that it is completely immersed in the water within the casing. Now when the device is used, the buoyancy of the main float presses up on the right hand side of the cross arm and the buoyancy of the compensating float 35 presses up on the left hand side of the cross arm to counteract the change in buoyancy of the main float due to changes in specific gravity of the water. In order to compensate for specific gravity, the compensating float 35 should have a volume at least equal to the normal displacement of the main float 31. The buoyancy of the compensating float is proportional to its water displacement, therefore, with it completely immersed the compensating buoyancy would be greater for salt water and, therefore, it would press the normally higher floating main float to a lower level and automatically equalize or compensate for the specific gravity of the water.

For a construction in which the floats are weighted as described with the compensating float having no buoyancy in fresh water, then when the instrument is immersed in salt water, the compensating float acquires sufficient buoyancy to overcome the increased buoyancy of the main float. If the weighting of the floats is related to salt water then when the instrument is used in fresh water, the compensating float acquires weight which overcomes the loss of buoyance of the main float.

The floats may be of any shape, however, with a main float of cylindrical shape and with the arms 30 of equal length, by making the compensating float 35 equal to half the volume of the main float 31, the compensating buoyancy of the compensating float is such that the water level is located at the mid point or horizontal mid diameter of the main float. In this position the volume displacement is at a maximum and uniform thereby giving accurate compensation for any change in the specfic gravity of water. It is for this reason that the horizontal mid line or mid plane of the main float 31 is positioned level with the surface 34 or more particularly with the float pointer 41 in alignment with the reference 45. When, therefore, the operator adjusts the level of the casing so that the float pointer 41 and the reference 45 are in alignment, he knows the level of the water or surface corresponds with the surface 34 or the mid position of the float and, therefore, the reading of the tape 71 is the elevation of the bottom of the foot or the top of the deck of the barge above the true water level.

It may be that the operator will have difficulty in aligning the float pointer with the reference mark or pointer 45 when the barge is tied up beside a pier or alongside another barge or ship. In such event he may secure approximate alignment and then lift the device up out of the water. When the instrument is withdrawn from the water the by-pass permits the water below the valve to drop away and the valve seats. The pressure within on the valve would not and does not close the valve; the water around the float keeps it open and it stays open until that water is removed. The scale 46 may be graduated, for example, in one-one hundredths of a foot of water level so that by raising the casing to the deck and examining the position of the float pointer 41 with respect to or on the scale 46, he will known whether to add or subtract one or more hundredths to his tape measurement depending upon whether the pointer is on the plus or right hand side of the scale 46 or on the subtract or left hand side of the scale. In other words, the water level within the casing was above or below the actual mean water level by this amount. Since the pointer 41 is at a distance from the pivot axis, the water level position is amplified by the pointer to give a more precise reading. This assures that the operator secures an accurate reading even though he has been unable to precisely align the float pointer with the reference pointer 45.

It is understood that it is not necessary to use a tape 71 as the suspension means but it may be any suspending means. In such event the position at surface 81 may be marked on the suspension means. The distance from the surface 34 to the mark can then be measured and the distance between surface 80 of the float and the surface 81 subtracted from the reading. This, however, is not as convenient as using the device or instrument with a tape. The floats may be of any material, however, hollow floats have greater buoyancy and hence are more precise. The floats are shown dependent from the cross arms or rocker, however, this is not essential. By altering the lever arms, changes in the relative size and weight of the compensating float may be made. In order to assure that the floats remain vertical or substantially vertical a guide means 88, 89 may be provided.

This invention is presented to fill a need for improvements in an instrument for determining the elevation above water level. It is understood that various modifications in structure, as well as changes in mode of operation, assembly and manner of use, may and often do occur to those skilled in the art, especially after benefiting from the teachings of an invention. This disclosure illustrates the preferred means of embodying the invention in useful form.

What is claimed is:

An instrument for determining the elevation of a point above the mean water level comprising a casing of a size and weight easily manipulated manually and forming a water chamber having upper and lower portions, the casing having a fixed water level surface to mark the proper level of the casing when used, a vent into the upper portion of the chamber, a water inlet into the lower portion of the chamber and having a flexible portion extending a substantial distance below the casing, suspension means connected with the casing to suspend the same, a first float in the chamber, indicator means connected with the float and movable thereby to indicate the position of the float within the chamber, a second float within the chamber having a volume less than that of the first float and a submerged volume equal to the normal submerged volume of the first float, and means connecting the floats together so that their buoyancy forces are in opposition to automaticaly compensate for the specific gravity of the water, and means carried by the casing to retain the floats in essentially vertical position, and a nozzle on the end of the water inlet remote from the casing having a central passage and an outer surface and oppositely directed angular passages from the outer surface into the central passage.

References Cited in the file of this patent

UNITED STATES PATENTS

| | | |
|---|---|---|
| 1,788,465 | Lamar | Jan. 13, 1931 |
| 2,038,273 | Eynon | Apr. 21, 1936 |
| 2,110,490 | Renner | Mar. 8, 1938 |
| 2,265,647 | King | Dec. 9, 1941 |
| 2,561,171 | Bickley | July 17, 1951 |

FOREIGN PATENTS

| | | |
|---|---|---|
| 702,984 | France | Feb. 2, 1930 |